US012768219B2

(12) United States Patent
Guo

(10) Patent No.: US 12,768,219 B2
(45) Date of Patent: Oct. 20, 2026

(54) TELESCOPIC DOOR RAILING

(71) Applicant: Zhongshan Chenbei Daily Necessities Co., Ltd., Zhongshan City (CN)

(72) Inventor: Xin Guo, Zhongshan City (CN)

( * ) Notice: Subject to any disclaimer, the term of this patent is extended or adjusted under 35 U.S.C. 154(b) by 0 days.

(21) Appl. No.: 18/951,333

(22) Filed: Nov. 18, 2024

(65) Prior Publication Data

US 2026/0098440 A1 Apr. 9, 2026

(30) Foreign Application Priority Data

May 27, 2024 (CN) ........................ 202421169792.0

(51) Int. Cl.
*E06B 9/04* (2006.01)
*E06B 9/01* (2006.01)
*E06B 9/06* (2006.01)

(52) U.S. Cl.
CPC .................. *E06B 9/04* (2013.01); *E06B 9/01* (2013.01); *E06B 9/06* (2013.01)

(58) Field of Classification Search
CPC ................................................ E06B 2009/002
USPC ............................................................ 49/55
See application file for complete search history.

(56) References Cited

U.S. PATENT DOCUMENTS 6,112,460 A * 9/2000 Wagnitz .................... E06B 9/04 49/55
8,713,851 B2 * 5/2014 Flannery ................ E06B 11/04 49/55
12,421,793 B1 * 9/2025 Feng .......................... E06B 9/04
2004/0045222 A1 * 3/2004 Hicks ........................ E06B 9/04 49/157
2006/0042163 A1 * 3/2006 Nitz .......................... E06B 9/04 49/55
2010/0290830 A1 * 11/2010 Cheng ...................... E06B 9/02 403/289

* cited by examiner

*Primary Examiner* — Marcus Menezes
(74) *Attorney, Agent, or Firm* — Sandy Lipkin

(57) ABSTRACT

The present invention discloses a telescopic door railing, comprising a vertical pole A on which side a main frame is provided; vertical pole B on which side an auxiliary frame is provided; several sliding connection components that are disposed between the main frame and auxiliary frame; and the main rotating connection component that is disposed at the upper end between vertical pole A and main frame. By providing sliding connection components, the present invention connects main frame and auxiliary frame into a telescopic body through a fixed frame, and fixes the main frame and auxiliary frame through the mutual cooperation between screws, nuts, and top plates, so that this product is suitable for different installation environments, can improve product utilization, facilitate mass production by manufacturers and reduce costs, and the entire product having independent components is not limited by the length of door frame, facilitating product packaging.

7 Claims, 7 Drawing Sheets

TELESCOPIC DOOR RAILING

REFERENCE TO PRIOR APPLICATION

This application claims priority to Chinese Patent Application 202421169792.0, filed on May 27, 2024, which is incorporated herein by reference.

TECHNICAL FIELD

The present invention relates to the field of door railing technology, particularly to a telescopic door railing.

BACKGROUND

Child guardrails mainly serve to protect children and limit their range of activities within a safe area. Current child guardrails are mainly used at the bedside to prevent children from falling off the bed, or to enclose a certain range on the ground for children to move and play, but the guardrail space enclosed on the ground is not very large due to the limitation by the environmental space, and only a partial space of a room is enclosed by a fence to form a space for children, and children are subjected to limited activity space and range. In order to expand the activity range of children, manufacturers therefore have designed some guardrails that can use the entire room as a space for children, and guardrails are fixedly installed on the door frames of the room to isolate the room from the outside and prevent children from leaving the room. However, currently such guardrails must be customized according to the length between the door frames on both sides, and the distance between door frames must be measured before product installation, followed by customization by the manufacturer, resulting in relatively high purchase costs. Manufacturers cannot implement mass production, and once customized, cannot change the size arbitrarily. Therefore, the product can only be installed one-on-one and fails to fit for door frames of any sizes, leading to reduced usage rate. Moreover, the guardrail with fixed width makes packaging difficult.

SUMMARY

Currently the above-mentioned guardrails must be customized according to the length between the door frames on both sides, and the distance between door frames must be measured before product installation, followed by customization by the manufacturer, resulting in relatively high purchase costs. Manufacturers cannot implement mass production, and once customized, cannot change the size arbitrarily. Therefore, the product can only be installed one-on-one and fails to fit for door frames of any sizes, leading to reduced usage rate. Moreover, the guardrail with fixed width makes packaging difficult.

In response to such guardrails, and in order to achieve above purposes, the present invention provides a telescopic door railing, comprising:

a vertical pole A on which side a main frame is provided;

a vertical pole B on which side an auxiliary frame is provided;

several sliding connection components that are disposed between the main frame and auxiliary frame;

a main rotating connection component that is disposed at the upper end between vertical pole A and main frame;

an auxiliary rotating connection component that is disposed at the lower end between vertical pole A and main frame;

a main locking connection component that is disposed at the upper end between vertical pole B and auxiliary frame, the locking connection component includes a handle that is fixedly fitted on one side of the upper end of auxiliary frame, the handle is movably provided with a slider inside, and the slider is movably provided with an insertion block inside, the upper end of vertical pole B is fixedly fitted with a fixed block A into which insertion block is movably fitted, and a spring A is provided between the insertion block and handle; and an auxiliary locking connection component that is disposed at the lower end between vertical pole B and auxiliary frame.

As a further technical solution, a connecting plate is connected to the lower end of handle, and a button that is movably embedded on the connecting plate passes through the interior of handle and fits with the slider, a spring B is provided between the handle and button, and a limit block that is connected to the upper surface of connecting plate passes through the handle and is movably embedded at the lower end of slider.

As a further technical solution, the sliding connection component comprises several fixed frames that are movably embedded on the main frame and auxiliary frame, one side of fixed frame is movably fitted with a top plate, and one side of fixed frame is movably embedded with a nut, and the nut is internally threaded with a screw that passes through the fixed frame.

As a further technical solution, the main rotating connection component comprises a fixed block B that is fixedly fitted on the upper end of vertical pole A, the upper end of fixed block B is fixedly connected to an intermediate member, and the upper end of the intermediate member is movably fitted with a connector A that is fixedly fitted on one side of the main frame, and a shaft on which a spring C is fitted is provided between the connector A and the intermediate member.

As a further technical solution, the auxiliary rotating connection component comprises a fixed block C that is fixedly fitted on the lower end of vertical pole A, and a connector B that is connected to a pin shaft on the fixed block C is fixedly fitted on the lower end at one side of the main frame.

As a further technical solution, auxiliary locking connection component comprises a rectangular block that is fixedly fitted inside the lower end at one side of the auxiliary frame, a plug is movably fitted inside the rectangular block, a fixed block D is fixedly fitted at the lower end of vertical pole B, the end of plug is movably embedded on one side of the fixed block D, a cap is fixedly fitted on one side of the rectangular block, and a spring D is provided between the plug and cap.

As a further technical solution, the lower end of the handle is bolted with a handrail.

As a further technical solution, the side surfaces of fixed block A, fixed block B, fixed block C, and fixed block D are all bolted with support plates.

Compared with prior art, the present invention has the following advantages and positive effects:

By providing sliding connection components, the present invention connects main frame and auxiliary frame into a telescopic body through a fixed frame, and fixes the main frame and auxiliary frame through the mutual cooperation between screws, nuts, and top plates, so that this product is suitable for different installation environments, can improve product utilization, facilitate mass production by manufacturers and reduce costs, and the entire product having independent components is not limited by the length of door frame, facilitating product packaging.

BRIEF DESCRIPTION OF DRAWINGS

In order to provide a clearer explanation of the technical solution of the embodiments of the present invention, the accompanying drawings required for the description of the embodiments will be briefly introduced below. Obviously, the accompanying drawings described below are some embodiments of the present invention, and those of ordinary skill in the art can also obtain other drawings based on these ones without creative labor.

As shown in the figure: 1. Vertical pole A; 2. Main frame; 3. Vertical pole B; 4. Auxiliary frame; 5. Sliding connection component; 5-1. Fixed frame; 5-2. Top plate; 5-3. Nut; 5-4. Screw; 6. Main rotating connection component; 6-1. Fixed block B; 6-2. Intermediate member; 6-3. Connector A; 6-4. Shaft; 6-5. Spring C; 7. Auxiliary rotating connection component; 7-1. Fixed block C; 7-2. Connector B; 8. Main locking connection component; 8-1. Handle; 8-2, Slider; 8-3. Insertion block; 8-4. Fixed block A; 8-5. Spring A; 8-6. connecting plate; 8-7. Button; 8-8. Spring B; 8-9. Limit block; 8-10. Handrails; 9. Auxiliary locking connection component; 9-1. Rectangular block; 9-2. Plug; 9-3. Fixed block D; 9-4. Cap; 9-5. Spring D; 10. Support plate.

DETAILED DESCRIPTION OF EMBODIMENTS

In order to better understand the above objectives, features, and advantages of the present invention, further explanation of the present invention will be provided below in conjunction with the accompanying drawings and embodiments. It should be noted that, without conflict, the embodiments and features of the present application can be combined with each other.

Many specific details are elaborated in the following description to facilitate a full understanding of the present invention. However, the present invention can also be implemented in other ways different from those described herein. Therefore, the present invention is not limited to the specific embodiments disclosed in the following specification.

Figure 1:
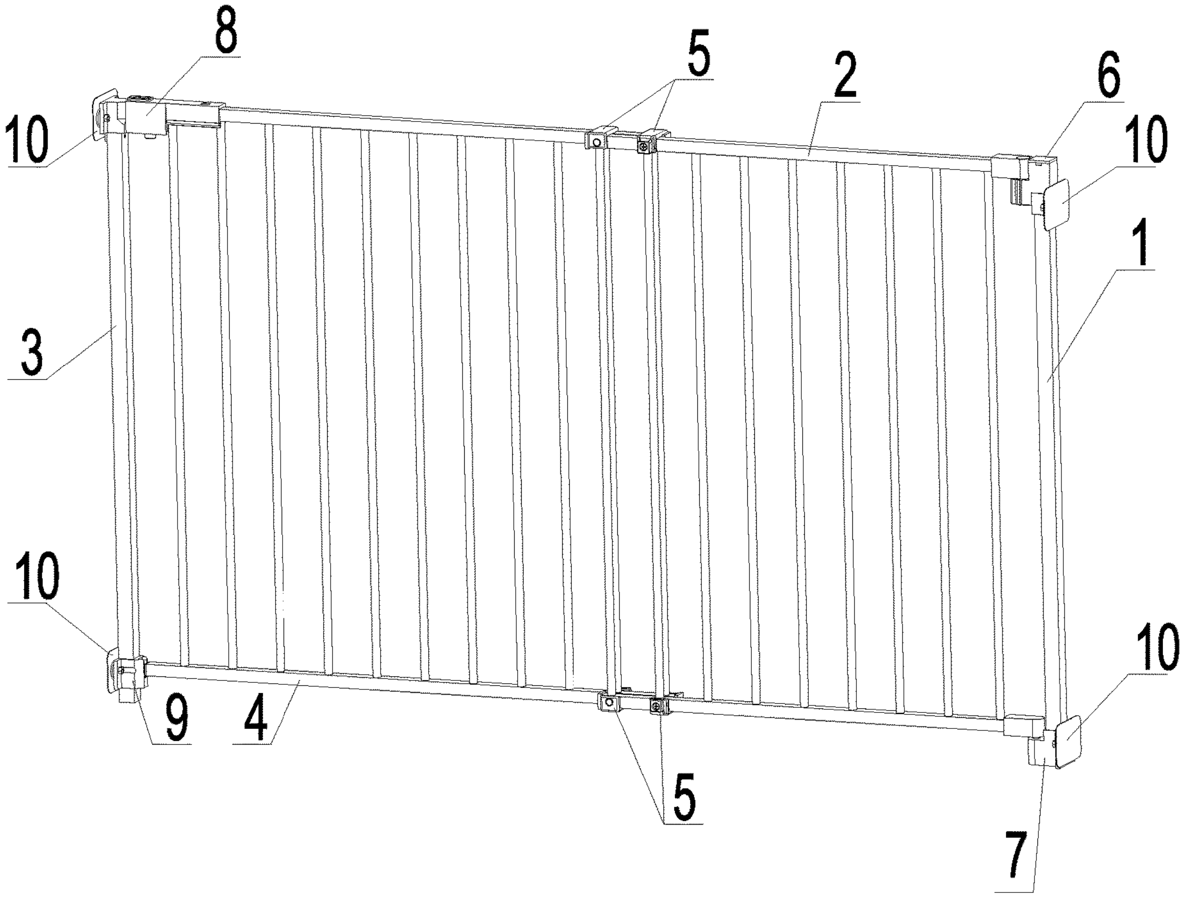
FIG. 1 is a perspective view of a telescopic railing provided in this embodiment.
Figure 2:
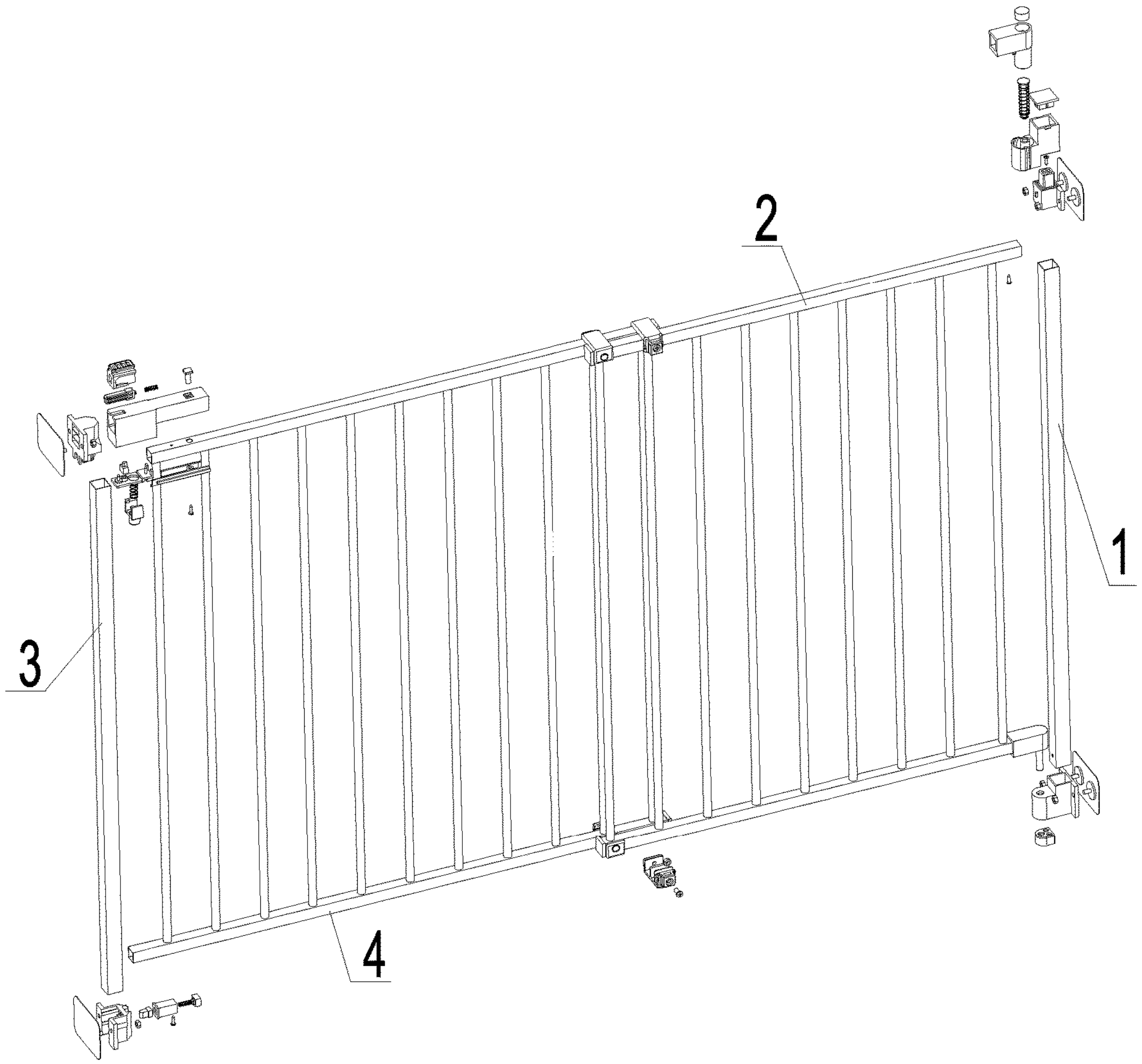
FIG. 2 is an exploded view of a telescopic railing provided in this embodiment.
Figure 3:
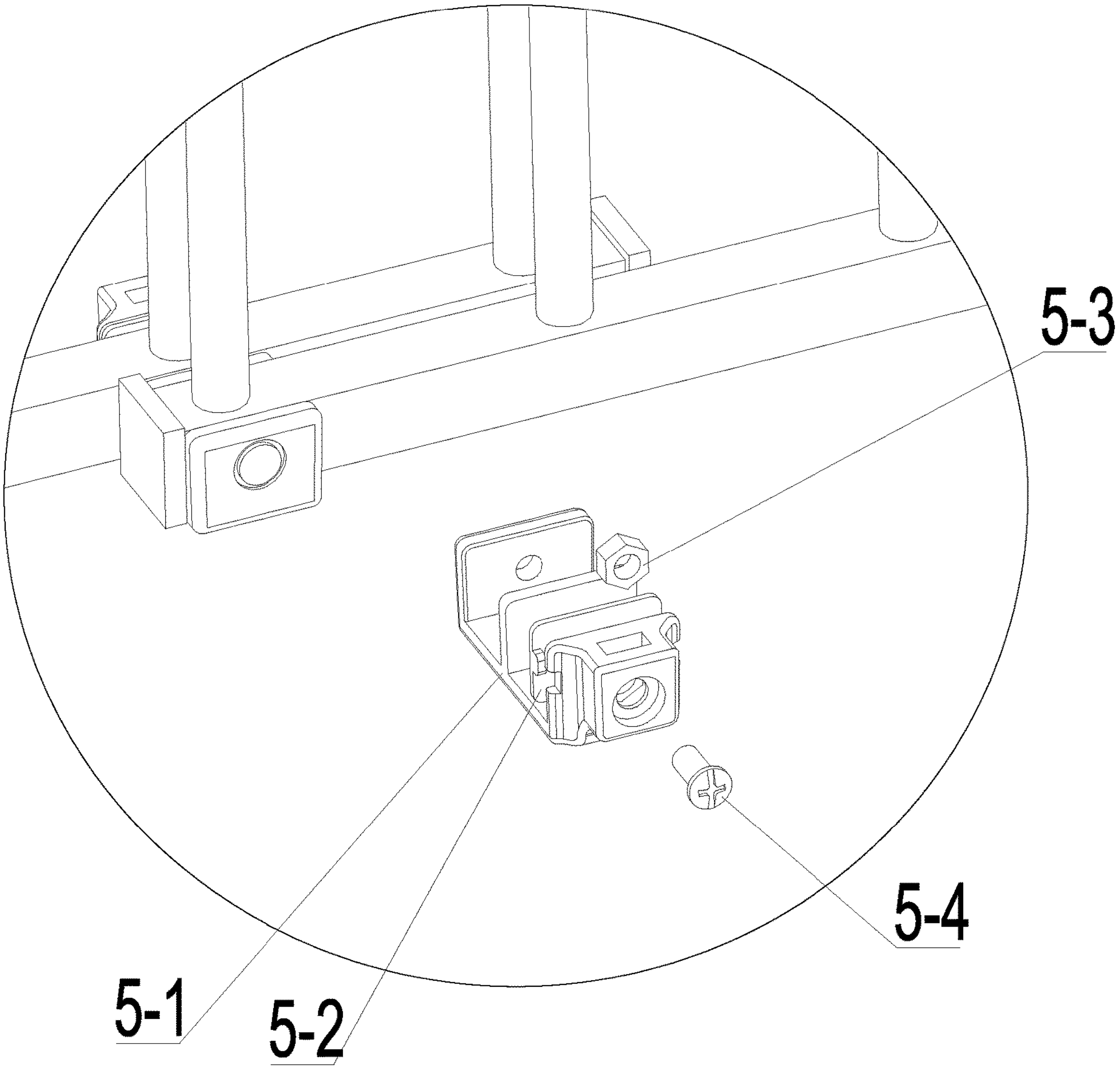
FIG. 3 is a partially enlarged view of FIG. 2.
Figure 4:
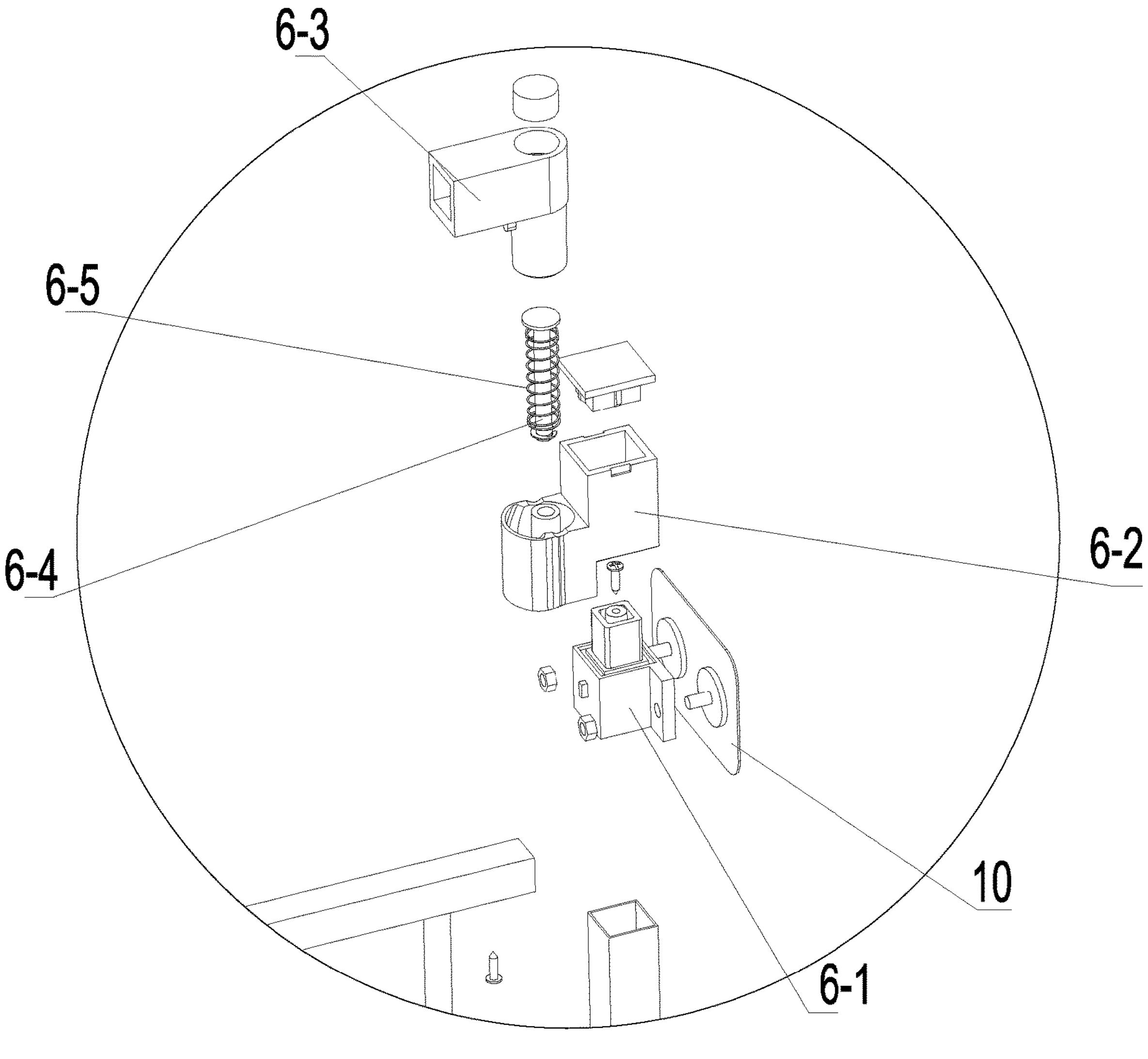
FIG. 4 is a partially enlarged view of FIG. 2.
Figure 5:
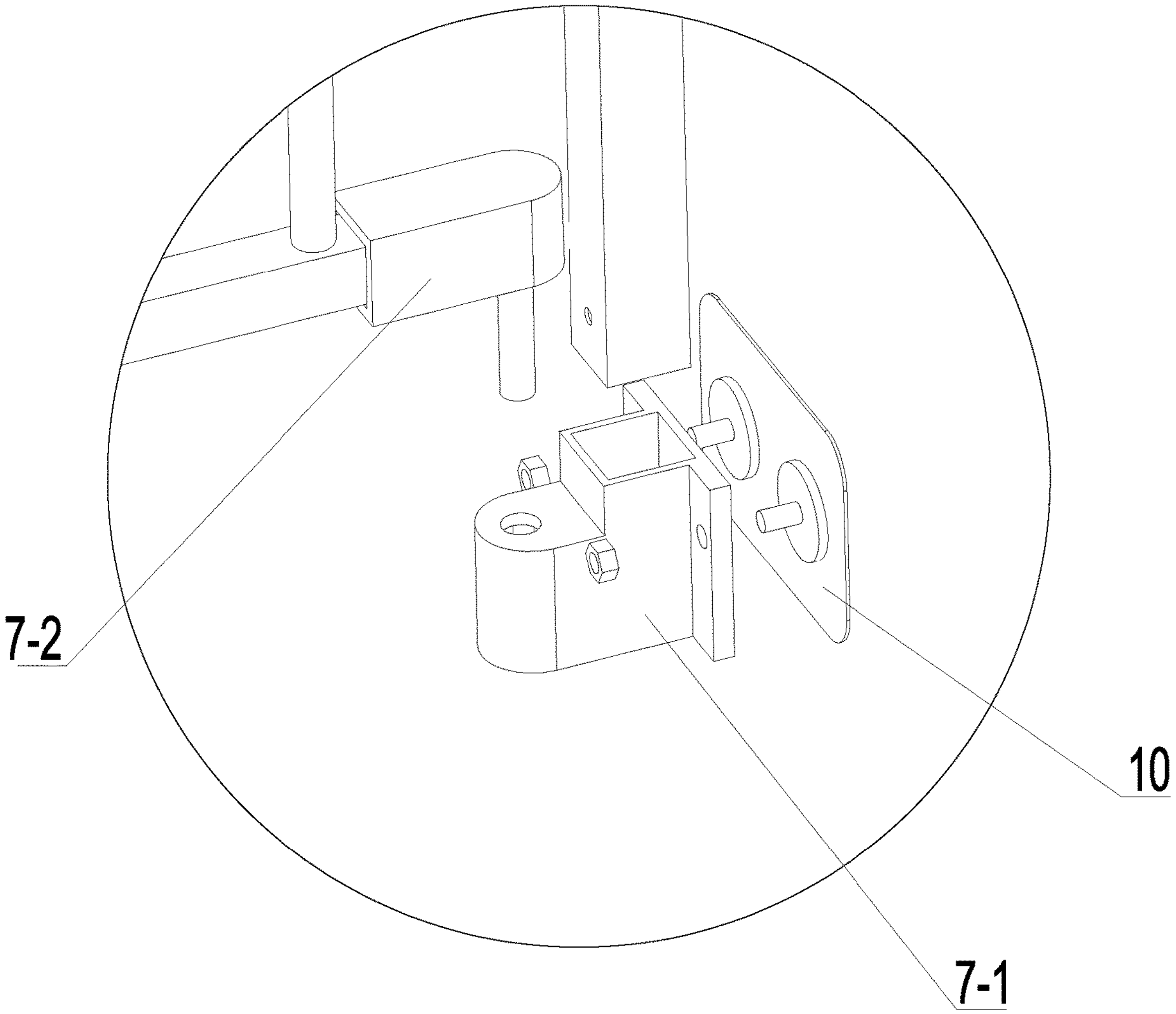
FIG. 5 is a partially enlarged view of FIG. 2.
Figure 6:
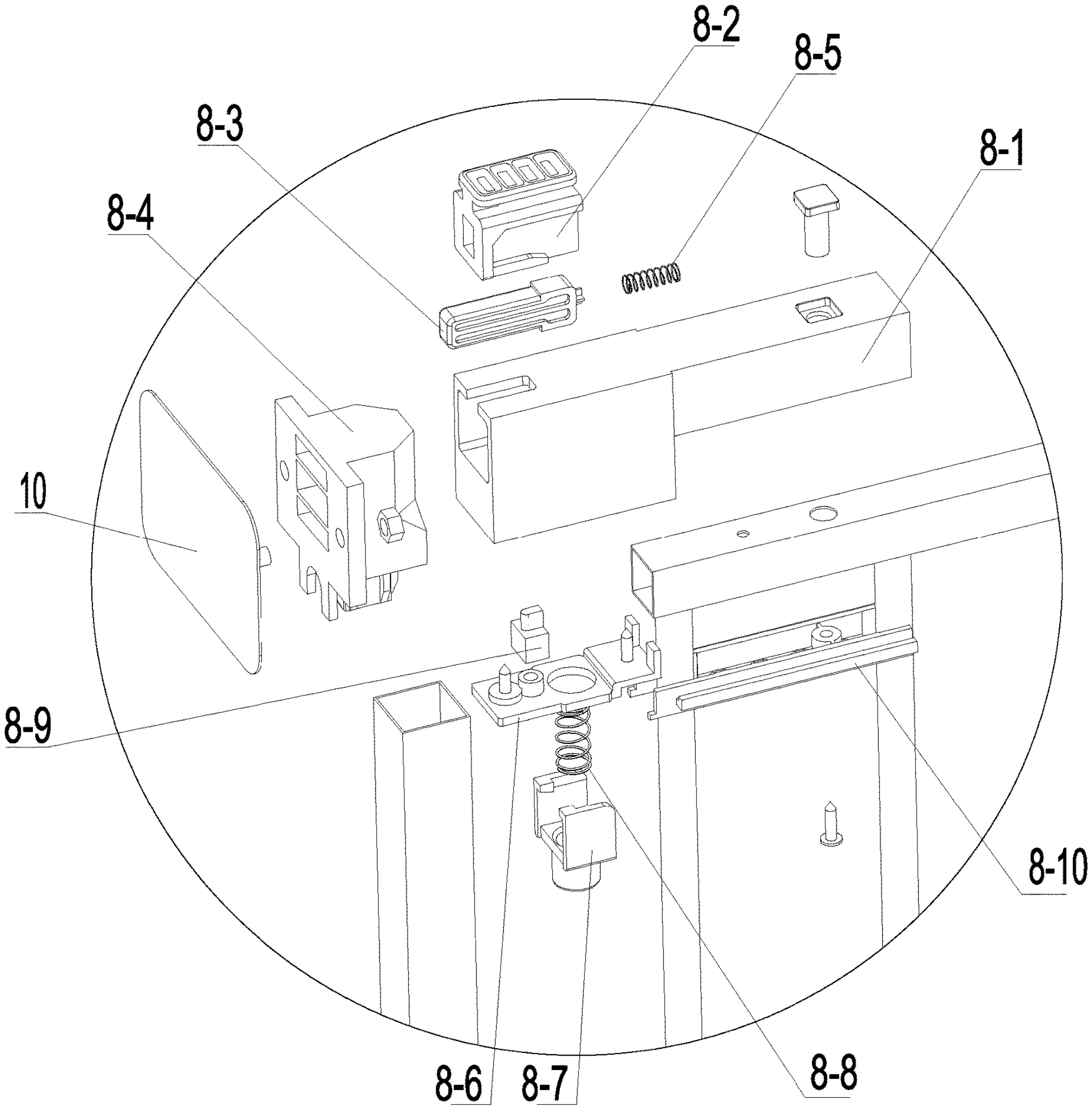
FIG. 6 is a partially enlarged view of FIG. 2.
Figure 7:
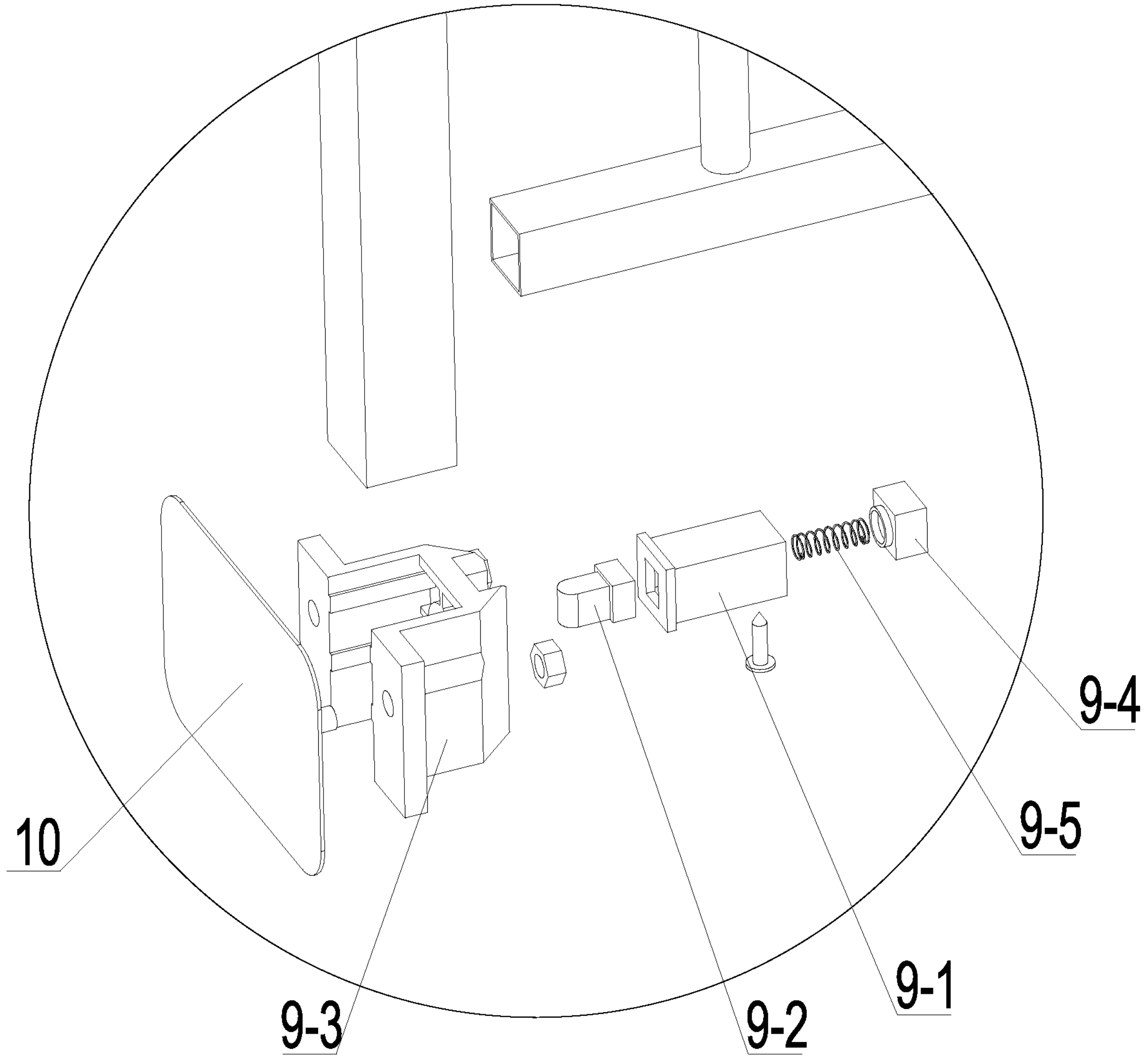
FIG. 7 is a partially enlarged view of FIG. 2.

According to the embodiments shown in FIG. 1-7 of the specification, this solution provides a telescopic door railing, comprising:

- a vertical pole A1 on which side a main frame 2 is provided;
- a vertical pole B3 on which side an auxiliary frame 4 is provided;
- several sliding connection components 5 that are disposed between the main frame 2 and auxiliary frame 4;
- a main rotating connection component 6 that is disposed at the upper end between vertical pole A 1 and main frame 2;
- an auxiliary rotating connection component 7 that is disposed at the lower end between vertical pole A 1 and main frame 2;
- a main locking connection component 8 that is disposed at the upper end between vertical pole B3 and auxiliary frame 4, the locking connection component includes a handle 8-1 that is fixedly fitted on one side of the upper end of auxiliary frame 4, the handle 8-1 is movably provided with a slider 8-2 inside, and the slider 8-2 is movably provided with an insertion block 8-3 inside, the upper end of vertical pole B (3) is fixedly fitted with a fixed block A8-4 into which insertion block 8-3 is movably fitted, and a spring A8-5 is provided between the insertion block 8-3 and handle 8-1; and
- an auxiliary locking connection component 9 that is disposed at the lower end between vertical pole B 3 and auxiliary frame 4.

In further, a connecting plate 8-6 is connected to the lower end of handle 8-1, and a button 8-7 that is movably embedded on the connecting plate 8-6 passes through the interior of handle 8-1 and fits with the slider 8-2, a spring B8-8 is provided between the handle 8-1 and button 8-7, and a limit block 8-9 that is connected to the upper surface of connecting plate 8-6 passes through the handle 8-1 and is movably embedded at the lower end of slider 8-2.

In this embodiment, the railing is locked through the main locking connection component 8, and a handle 8-1 is provided on the auxiliary frame 4, and is internally fitted with a slider 8-2, one end of the slider 8-2 is pressed against the fixed block A8-4 through a spring A8-5 to prevent children from opening the railing, the button 8-7 on the connecting plate 8-6 fits with the slider 8-2 to form a two-way lock structure to prevent accidental opening by the children, the spring B8-8 is used to hold the button 8-7, and the limit block 8-9 is embedded at the lower end of the slider 8-2 to limit the movement of slider 8-2.

In further, the sliding connection component 5 comprises several fixed frames 5-1 that are movably embedded on the main frame 2 and auxiliary frame 4, one side of fixed frame 5-1 is movably fitted with a top plate 5-2, and one side of fixed frame 5-1 is movably embedded with a nut 5-3, and the nut 5-3 is internally threaded with a screw 5-4 that passes through the fixed frame 5-1.

In this embodiment, the main frame 2 and auxiliary frame 4 are connected and fixed by the sliding connection component 5, the fixed frame 5-1 is embedded on the main frame 2 and auxiliary frame 4, and then the screw 5-4 is screwed to pass through the nut 5-3 against the top plate 5-2, and the top plate 5-2 is pressed against the surface of main frame 2 or auxiliary frame 4 to fix them, and the length between the main frame 2 and auxiliary frame 4 is adjusted by through sliding connection component 5.

In further, the main rotating connection component 6 comprises a fixed block B6-1 that is fixedly fitted on the upper end of vertical pole A1, the upper end of fixed block B6-1 is fixedly connected to an intermediate member 6-2, and the upper end of the intermediate member 6-2 is movably fitted with a connector A6-3 that is fixedly fitted on one side of the main frame 2, and a shaft 6-4 on which a spring C6-5 is fitted is provided between the connector A6-3 and the intermediate member 6-2.

In this embodiment, the main frame 2 is rotated through the main rotating connection component 6, the vertical pole A1 is connected to a fixed block B6-1 that is connected to an intermediate member 6-2, and the intermediate member 6-2 is connected to the connector A6-3 through shaft 6-4, and the automatic rotation function is realized through a spring C6-5.

In further, the auxiliary rotating connection component 7 comprises a fixed block C7-1 that is fixedly fitted on the lower end of vertical pole A1, and a connector B7-2 that is connected to a pin shaft on the fixed block C7-1 is fixedly fitted on the lower end at one side of the main frame 2.

In this embodiment, the lower end of vertical pole A1 is connected to a fixed block C7-1 that is connected to the pin shaft of connector B7-2 so that the main frame 2 is connected and rotated.

In further, auxiliary locking connection component 9 comprises a rectangular block 9-1 that is fixedly fitted inside the lower end at one side of the auxiliary frame 4, a plug 9-2 is movably fitted inside the rectangular block 9-1, a fixed block D9-3 is fixedly fitted at the lower end of vertical pole B3, the end of plug 9-2 is movably embedded on one side of the fixed block D9-3, a cap 9-4 is fixedly fitted on one side of the rectangular block 9-1, and a spring D9-5 is provided between the plug 9-2 and cap 9-4.

In this embodiment, the fixed block D9-3 is connected to the lower end of vertical pole B3, and the rectangular block 9-1 is fixed to one side of the lower end of auxiliary frame 4 and is inserted into the fixed block D9-3 through the plug 9-2, and the spring D9-5 is disposed between plug 9-4 and cap 9-2 to fix the auxiliary frame 4 and when external force pushes the auxiliary frame 4, the plug 9-2 leaves the fixed block D9-3.

In further, the lower end of the handle 8-1 is bolted with a handrail 8-10.

In this embodiment, the handrail 8-10 assists handle 8-1 to make the operation more comfortable.

In further, the side surfaces of fixed block A8-4, fixed block B6-1, fixed block C7-1, and fixed block D9-3 are all bolted with support plates 10.

In this embodiment, support plate 10 is attached to the door frame or wall to fix the entire structure.

It should be noted that in the specific implementation process, when the main frame 2 drives the auxiliary frame 4 to automatically rebound, the structure between the button 8-7 and slider 8-2 will not interfere with the insertion of insertion block 8-3 into the fixed block A8-4. However, it is required to press the button 8-7 when manually sliding the slider 8-2;

This structure is easy to disassemble, and can be used conveniently when all parts except for the fixed blocks A8-4, B6-1, C7-1, and D9-3 are disassembled after the vertical poles A1 and B3 are fixed to the door frame or wall by the support plate 10.

The above are only the preferred embodiments of the present invention, and are not intended to limit the present invention in any other form. Persons skilled in the art may use the technical content disclosed above to change or retrofit into equivalent embodiments for other fields. However, the simple modifications, equivalent changes, and retrofits made to the above embodiments based on the technical essence of present invention, without departing from the technical solution of the present invention, still fall within the protection scope of the technical solution of present invention.

What is claimed is:

1. A telescopic door railing, comprising:

a vertical pole (1) on a side of a main frame (2) is provided;

a vertical pole (3) on a side of an auxiliary frame (4) is provided;

several sliding connection components (5) are disposed between the main frame (2) and auxiliary frame (4);

a main rotating connection component (6) is disposed at an upper end between the vertical pole (1) on the side of the main frame and the main frame (2);

an auxiliary rotating connection component (7) is disposed at a lower end between the vertical pole (1) on the side of the main frame and the main frame (2);

a main locking connection component (8) is disposed at an upper end between the vertical pole (3) on the side of the auxiliary frame and the auxiliary frame (4), the locking connection component includes a handle (8-1) that is fixedly fitted on one side of an upper end of the auxiliary frame (4), the handle (8-1) is provided with a movable slider (8-2) therein, and the slider (8-2) is provided with a movable insertion block (8-3) therein, an upper end of the vertical pole (3) on the side of the auxiliary frame is fixedly fitted with a fixed block A (8-4) into which the insertion block (8-3) is movably fitted, and a spring (8-5) is provided between the insertion block (8-3) and the handle (8-1); and an auxiliary locking connection component (9) is disposed at a lower end between the vertical pole (3) on the side of the auxiliary frame and the auxiliary frame (4) wherein a connecting plate (8-6) is connected to a lower end of the handle (8-1), and a button (8-7) is movably embedded on the connecting plate (8-6) passes through an interior of the handle (8-1) and fits with the slider (8-2), a spring (8-8) is provided between the handle (8-1) and the button (8-7), and a limit block (8-9) that is connected to an upper surface of the connecting plate (8-6) passes through the handle (8-1) and is movably embedded at a lower end of the slider (8-2).

2. The telescopic railing according to claim 1, wherein the sliding connection components (5) comprise several fixed frames (5-1) that are movably embedded on the main frame (2) and the auxiliary frame (4), one side of each fixed frame (5-1) is movably fitted with a top plate (5-2), and one side of each fixed frame (5-1) is movably embedded with a nut (5-3), and the nut (5-3) is internally threaded with a screw (5-4) that passes through the fixed frame (5-1).

3. The telescopic railing according to claim 1, wherein the main rotating connection component (6) comprises a fixed block (6-1) that is fixedly fitted on the upper end of the vertical pole (1) on the side of the main frame, an upper end of the fixed block (6-1) is fixedly connected to an intermediate member (6-2), and an upper end of the intermediate member (6-2) is movably fitted with a connector (6-3) that is fixedly fitted on one side of the main frame (2), and a shaft (6-4) on which a spring (6-5) is fitted is provided between the connector (6-3) and the intermediate member (6-2).

4. The telescopic railing according to claim 1, wherein the auxiliary rotating connection component (7) comprises a fixed block (7-1) that is fixedly fitted on a lower end of the vertical pole (1) on the side of the main frame, and a connector (7-2) that is connected to a pin shaft on the fixed block (7-1) is fixedly fitted on a lower end at one side of the main frame (2).

5. The telescopic railing according to claim 1, wherein the auxiliary locking connection component (9) comprises a rectangular block (9-1) that is fixedly fitted inside a lower end at one side of the auxiliary frame (4), a plug (9-2) is movably fitted inside rectangular block (9-1), a fixed block (9-3) is fixedly fitted at a lower end of the vertical pole (3) on the side of the auxiliary frame, an end of the plug (9-2) is movably embedded on one side of the fixed block (9-3), a cap (9-4) is fixedly fitted on one side of the rectangular block (9-1), and a spring (9-5) is provided between the plug (9-2) and the cap (9-4).

6. The telescopic railing according to claim 5, wherein side surfaces of the fixed blocks are all bolted with support plates (10).

7. The telescopic railing according to claim 1, wherein a lower end of the handle (8-1) is bolted with a handrail (8-10).

* * * * *